Aug. 16, 1966 W. P. DUMKE ETAL 3,267,294
SOLID STATE LIGHT EMISSIVE DIODES HAVING
NEGATIVE RESISTANCE CHARACTERISTICS
Filed Nov. 26, 1963 2 Sheets-Sheet 1

INVENTORS
WILLIAM P. DUMKE
RALPH S. LEVITT
KURT WEISER

BY [signature]
ATTORNEY

United States Patent Office 3,267,294

Patented August 16, 1966

3,267,294

SOLID STATE LIGHT EMISSIVE DIODES HAVING NEGATIVE RESISTANCE CHARACTERISTICS

William P. Dumke, Chappaqua, Ralph S. Levitt, Ossining, and Kurt Weiser, Millwood, N.Y., assignors to International Business Machines Corporation, New York, N.Y., a corporation of New York Filed Nov. 26, 1963, Ser. No. 326,114
7 Claims. (Cl. 307—88.5)

The present invention relates to a class of solid state diodes exhibiting the property of injection electroluminescence. More particularly, the invention relates to such diodes having a negative resistance characteristic.

The field of optics in recent years has been undergoing continual development and change, especially in the fields of communications, computer and other allied technologies. This is due in larg part to the development in recent years of both the gas and solid state laser. The development of these devices has made apparent the possibilities of utilizing light both for the transmission of energy and for performing logic operations as in a computer. Concurrently, with this work on lasers, many developments are being made in allied fields, such as ELPC's and various types of light switches and modulators which are necessary for the successful implementation of the laser in any of the above indicated systems. An especially interesting device announced about a year ago simultaneously by both General Electric Corporation and International Business Machines Corporation was the injection laser which made possible a laser type of device capable of relatively high electrical efficiency at a relatively low cost.

The development of such injection lasers has itself stimulated considerable interest in the optical field both for communication and logic operations. It is with this latter field, i.e., optical logic, that the present invention is primarily concerned.

It has now been discovered that an electroluminescent negative resistance diode can be made having two stable states of operation, each of which has a characteristic electroluminescent emission frequency. It has further been found that such a diode may be switched from one stable state to the other by changing the bias voltage across the junction alternatively, by shining light of a predetermined frequency on the junction, the diode may be switched from a low to high current state.

It is accordingly a primary object of the present invention to provide an electroluminescent diode having negative resistance characteristics and to a method of making same.

It is a further object to provide such a diode which is capable of operation in either of two stable electroluminescent states.

It is yet another object to provide such a diode capable of high switching speeds between said two stable states.

It is a further object to provide an electroluminescent diode having negative resistance which may be switched from a low to high current stable state by external illumination.

It is another object of the invention to provide such a diode in which the characteristics of the illumination at each of said stable states differs.

It is still another object to provide such a diode by doping a single gallium arsenide crystal with manganese and zinc conductivity type determining impurities.

The foregoing and other objects, features and advantages of the invention will be apparent from the following more particular description of preferred embodiments of the invention, as illustrated in the accompanying drawings.

Figure 1:
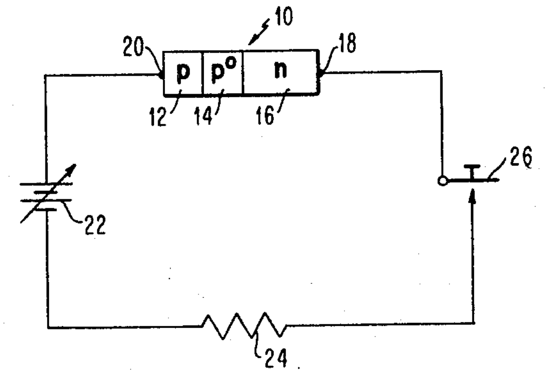
FIGURE 1 is a cross sectional view of an electroluminescent diode incorporating the principles of the present invention.
Figures 3A, 3B:
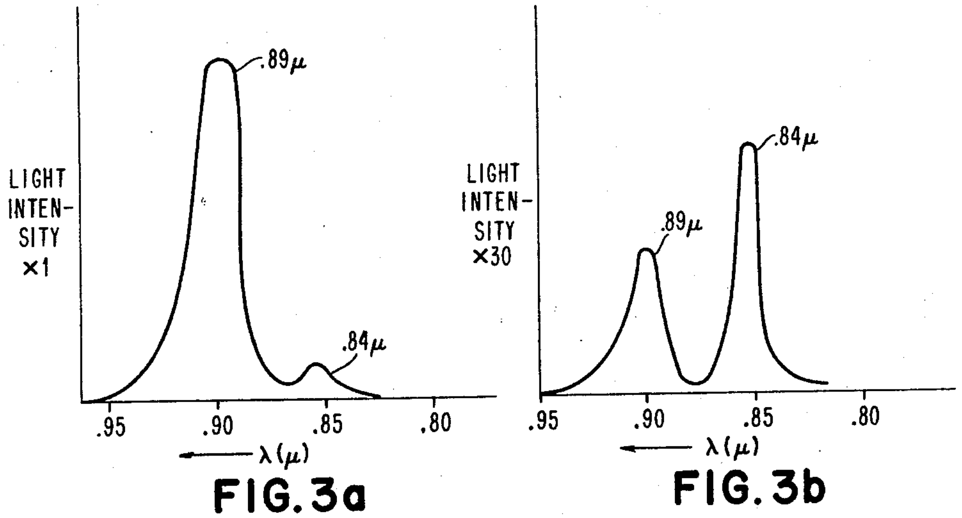

FIGURES 3*a* and 3*b* are curves illustrating the spectral intensity distribution of the diode of FIGURE 1 at its two stable states of operation.

Figure 4:
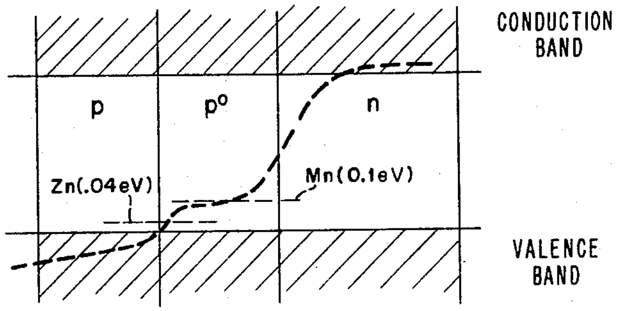

FIGURE 4 is an energy band diagram for the diode of FIGURE 1.

Figure 5:
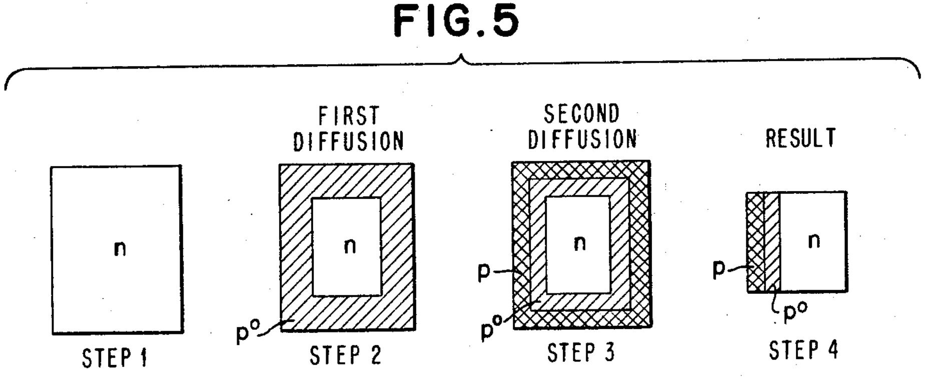
Figure 6:
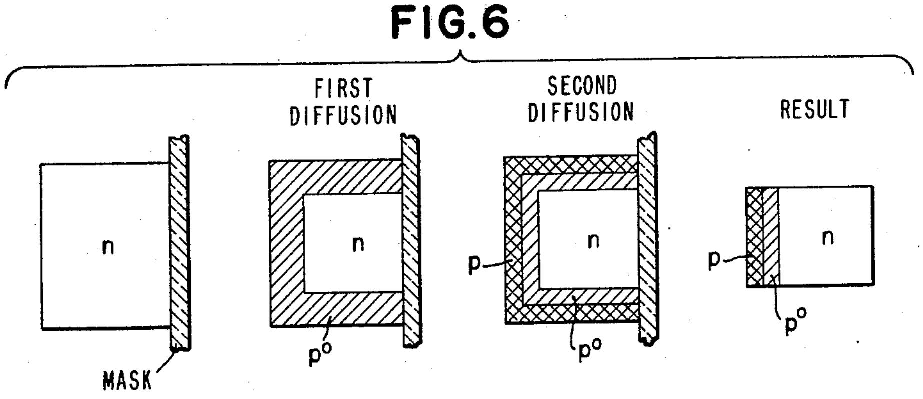

FIGURES 5 and 6 are cross sectional views showing the diode as it is being fabricated by two alternative fabrication methods.

The objects of the present invention are accomplished in general by an electroluminescent diode having negative resistance characteristics comprising an n-type gallium arsenide body having a p-type high resistivity layer thereon containing manganese as the predominant conductivity type determining impurity and a second low resistivity p-type layer thereon containing zinc as the predominant conductivity type determining impurity, said diode further being provided with ohmic contacts to the n-type gallium arsenide body and the low resistivity p-type layer.

At room temperatures, the *i-v* characteristics of this diode are the same as that of any ordinary GaAs diode, having a shallow acceptor such as zinc or cadmium on the "p" side. At liquid nitrogen temperatures, however, the diodes show a high series resistance at voltages beyond approximately one volt where ordinary diodes begin to conduct current. When a critical breakdown voltage is reached, however, a negative resistance region sets in, in which the current goes up with decreasing voltage. The specific breakdown voltage will depend on the diffusion profile as will be discussed more fully subsequently.

Electroluminescence occurs in the diode both before and after breakdown. It is very important to note that the spectral intensity distribution of the two states of operation of the diode, i.e., before and after breakdown, varies considerably. Further, the intensity of the overall light varies considerably between these two states. For example, the intensity in a number of operating examples was between ten and one hundred times greater in the high current operating state. It has also been found with the present diode, that by illuminating said diode with a particular wavelength illumination, the *i-v* characteristic for the diode is temporarily shifted by said illumination so as to, in effect, cause a change in the instantaneous breakdown voltage. This characteristic can be utilized to cause the diode to switch from a low to a high current state by illuminating same. The switching speed of the diode from low to high current operation and in the reverse direction is quite rapid, on the order of tens of nanoseconds, thus making the device a potential high speed logic circuit element.

It may be seen that the diode of the present invention has potential utility as a light amplifier, which makes it suitable for use as a possible image converter. Likewise, the characteristic of optical switching together with the two possible optical states suits the device for inclusion in a wide variety of optical logic circuits. While it is not the object of the present invention to set forth or claim any of the above suggested systems, co-pending application Serial No. 326,171, filed concurrently with the present application in the names of R. S. Levitt and K. Weiser, discloses a number of such specific systems incorporating one or more of these electroluminescent negative resistance diodes therein.

Having thus generally described the objects, features and advantages of the present invention, there will follow a more complete description of the device, its theory of operation and a suitable method for making same. Referring now more specifically to the drawings:

FIGURE 1 is a simplified schematic showing the diode of the present invention in cross sectional form. The diode 10, as indicated previously, is composed of a gallium arsenide "n" doped base having a high resistivity "p°" layer 14 and a low resistivity "p" layer 12 formed by Mn and Zn diffusions respectively. Ohmic contacts 18 and 20 are provided to the "n" region 16 and the low resistivity "p" region 12. The basic external circuitry shown in FIGURE 1 is composed of the variable bias source 22, a load resistor 24 and a switch 26. It is, of course, to be understood that this circuit is merely for the purpose of performing experiments with the device and in an actual operative embodiment, more complex circuitry would be utilized for the purpose of changing the bias on the device if voltage or current switching of the device were anticipated. As will be apparent, the actual junction lies between the "p°" region 14 and the "n" region 16; however, as will be explained subsequently, the zinc doped low resistivity "p" region 12 plays an active part in determining the characteristics of the device together with the "p°" region 14 which is doped with manganese (Mn). Stated briefly, the diode is prepared by diffusing manganese (Mn) into an n-type GaAs crystal following by a much shallower zinc (Zn) diffusion into the same crystal. This diffusion forms the "p°" layer 14 adjacent the "n" region having the predominant conductivity type determining impurity Mn and the subsequent low resistivity "p" region 12 adjacent the high resistivity "p" region 14, said low resistivity region having the predominant impurity Zn.

Figure 2:
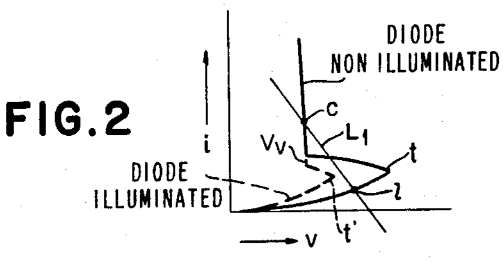
FIGURE 2 is a characteristic curve of diode voltage plotted against current illustrating the principles of operation of the diode of the invention.

The operational characteristics of the devices are clearly illustrated in the curves of FIGURE 2. In this figure, the current through the diode is plotted versus the voltage across the diode. The solid curve represents the characteristic of the diode with no external photo-energy being applied thereto and the dotted line represents the characteristic with the diode being illuminated by an external light source. Referring back to the circuit of FIGURE 1 with the switch 26 closed, as the voltage source 22 is slowly varied from zero with the diode maintained at approximate liquid nitrogen temperature (77° K.). It will be noted that the current increases rather slowly with increasing voltage indicating a high resistance phase of the diode. As the voltage is increased further to point *t*, a negative resistance portion of the diode is encountered and the current will markedly increase and the voltage across the diode will drop. Assuming a fixed value for the resistor 24, the voltage and current values indicated by the intersection of load line $L_1$ with the solid curve at point *c* will be established across the diode. Stated differently, the points *c* and *l* which are the intersections of the load line $L_1$ with the diode characteristic represent the two stable operating states of the diode with a given load resistance 24. It may thus be seen that the diode may be switched from point *l* to point *c* by applying an increment of voltage sufficient to raise the voltage across the diode to point *t*. Thus, with a bias applied, by measuring the current flow through the diode to determine whether the current is representative of point *c* or point *l*, it may be determined whether an increment of voltage sufficient to switch the diode from point *l* to point *c* has been previously applied relative to any particular time.

The dotted curve of FIGURE 2 illustrates another significant property of the present diode. This dotted curve represents the characteristic of the diode when an external illuminating source is shone thereon. It may be seen from this curve that the resistance of the diode is lowered in certain areas of operation and the switching or critical point of the diode from the low to high current state is re-established at *t'*. It may be seen from FIGURE 2 and the relative positions of the solid and dotted curves that, assuming the un-illuminated condition, the diode is stable at point *l* with a voltage across the diode of $V_1$. Now, if an external light source is shone upon the diode, the characteristic will be shifted to the dotted line wherein it will be seen that $V_1$ is greater than the new critical voltage *t'*. Thus, the diode will switch and be stable at point *c*, in the high current condition of the diode where the two curves are substantially coincident. Now if the illumination is removed, the diode will remain at point *c* on the non-illuminated characteristic curve.

From the above explanation, it will be seen that the diode of the invention may be switched from the low to high current state either by increasing the voltage past the critical point *t* or by illuminating same so that the critical point *t'* is less than the previous stable operating voltage for the diode. Voltage switching or light switching of the diode from the low to high current state is thus possible with the device. It will, of course, be obvious that the only way that the diode can be switched back to the low current state is to temporarily interrupt the circuit by opening switch 26 or by momentarily lowering the voltage across the diode below $V_v$, the valley voltage, so that its operating state will return to point *l* on its characteristic curve.

Referring now to FIGURES 3*a* and 3*b*, there is shown a plot of the spectral distribution of the light radiation, of a typical diode of the invention both before and after switching from a low current to the high current state. FIGURE 3*a* illustrates the spectral distribution at the low current state of operation. It will be noted that at this state, the light of .89 micron wavelength which is characteristic of the manganese content of the "p°" region is considerably greater than the .84 micron wavelength radiation which is characteristic of the zinc or "p" region. Looking now at FIGURE 3*b*, it will be seen that after switching to the high current state, the zinc radiation or the .84 micron wavelength radiation is greater than the manganese radiation. It should also be noted that while the light intensity scale as shown is in arbitrary units in both of the two figures, there is a multiplication factor of 30 between FIGURES 3*a* and 3*b*. In other words, the magnitude of FIGURE 3*b* would have to be multiplied by a factor of 30 to make an absolute comparison with FIGURE 3*a*. The above figures were obtained using an external voltage and resistance giving currents of 5 ma. and 70 ma. in the low and high current conditions respectively. It may thus be seen that the total light output after switching is about 30 times as great as before switching. However, it will be noticed that the ratio of change between the zinc line, i.e., .84 micron wavelength, is much greater than for the manganese characteristic line, i.e., .89 micron wavelength. Therefore, a detection cell utilizing a filter for passing only the .84 micron wavelength would be far more effective and sensitive in determining whether the diode were in a high or low current state at a given time. The data for plotting the curves of FIGURES 3*a* and 3*b* was obtained using the particular diodes described in the subsequent example.

Varying the width and concentration of the zinc and manganese impurities in the diode will vary the relationships indicated in the spectral distribution curves of FIGURE 3; however, the general relationship applies in that the zinc line is a more sensitive measure of the current operating state of the diode than the manganese line.

The following is thought to be a correct explanation of the theory of operation of the diode of the present invention; however, it is noted that the theory of operation of such solid state semiconductor devices is extremely involved and many different theories exist for the particular effects noted in a given experiment or in a given device. It is accordingly to be noted that the invention is not intended to be in any way limited by the following description. The high resistivity "p°" region 14 formed by introducing manganese (Mn) as the conductivity type determining impurity is flanked by two low resistivity regions 12 and 16. The region 12 contains the "p" conductivity type determining impurity Zn. The n-type impurity in the gallium arsenide crystal in the starting block may be any one of a number of such conductivity type impurities such as Te, Se or Si. The high resistivity region "p°" exists due to the fact that at 77° K. essentially all of the Mn centers in excess of those which compensate the original donors of the n-type GaAs are neutral. At low currents from the battery such as 22 of FIGURE 1 before the on-set of negative resistance, electrons traverse the "p°" region and combine with holes in the vicinity of the "p–p°" boundary. Observation of the origin of light in sample diodes while changing the voltages and currents with respect to such diodes indicates that the width of the "p°" regions were typically 30 microns.

When the critical or threshold voltage is reached, using four volts as an example with a given load resistance, negative resistance sets in in the device until the voltage drops to about 2.2 volts. The *i-v* curve becomes positive again at this point and the spectral distribution and the intensity of the light as a function of the current before and after negative resistance indicate that the light emitted is accompanied by a filling of the Zn centers and the Mn centers with holes.

FIGURE 4 is a conventional energy level diagram at 77° K. for a typical electroluminescent negative resistance diode constructed in accordance with the principles of the present invention. In this diagram, the conduction and valence bands are labeled as are the three regions of the diode, the "p," "p°" and "n" region. The Fermi level is shown as the dotted line passing through the three regions. In terms of charged and uncharged impurities, the "p°" region is characterized by a constant density $N_D$ of positively charged donor ions, an equal intensity of negatively charged manganese ions and a non-uniform density of neutral manganese atoms. In the "p" region, the $N_D$ positively charged donor ions are compensated by an equal number of negative Zn ions and all manganese centers are neutral; zinc atoms in excess of $N_D$ provide the conducting holes. At the boundary between the "p" and "p°" regions, there are a comparable number of negative manganese zinc ions. It will be noted that the acceptor levels indicated for Zn .04 ev. and Mn 0.1 ev. are obtained from published data.

Two alternative methods of fabricating a diode such as that shown in FIGURE 1 according to the teachings of the present invention are illustrated in FIGURES 5 and 6. Referring specifically to FIGURE 5, a block of n-type GaAs is obtained and machined to a desired shape as indicated in step 1. The second step involves a first diffusion of a p-type impurity into the block of material. The preferred p-type acceptor impurity diffused into the block during this first diffusion step is manganese. After this first diffusion step, the original block of gallium arsenide material appears substantially as in step 2. Next, a second diffusion step occurs in which another p-type surface layer is diffused into the block of material. The "p" conductivity type determining impurity in this case is preferably Zn. The depth of the second diffusion is not critical; however, it must be less than the first diffusion, since a "p°" region must be maintained in the device. Varying the width of the "p°" region determines the characteristics of the device. It should further be noted that this second "p" conductivity type determining impurity material is a shallow level acceptor as comparied with the deeper level conductivity type determining impurity Mn. Following the second diffusion step, the device appears as in step 3 of FIGURE 5. Next, the back and sides may be ground, cut or otherwise removed, giving the resultant "p–p°–n" device shown in step 4. Ohmic contacts are then made in a conventional manner to either side with the device, i.e., the "p" and "n" layers.

FIGURE 6 shows a slightly different method of preparing such a device in that a mask is used on one or more of the sides of the n-type gallium arsenide crystal to inhibit diffusion in all but the desired area of the crystal. Thus, a first diffusion takes place with manganese as in FIGURE 5 and a subsequent second diffusion with zinc similarly as in FIGURE 5. As a final step assuming that the mask is planar, the top and bottom layers would have to be removed, although it is possible that a mask covering three sides could be used in practicing the invention.

In the processes described both in FIGURES 5 and 6, the actual diffusions take place in, for example, a sealed quartz tube or furnace provided with heating coils which have been suitably evacuated. In the method indicated both in FIGURES 5 and 6, it would be possible to first clean and etch the basic crystal, place the device in a quartz tube together with chips of zinc and manganese on either side of said block of base material but removed somewhat therefrom. Next, the quartz tube would be sealed and evacuated, then the area of the quartz tube containing the gallium arsenide crystal material in the manganese would be heated as with suitable heating coils and the first diffusion step completed and subsequently the area of the tube containing zinc would be heated with the resulting double diffusion article shown in FIGURES 5 and 6.

In a specific example in which a diode constructed in accordance with the teachings of the present invention was fabricated, an n-type GaAs crystalline body and manganese and zinc dopants used as described above. A GaAs wafer having an n-type conductivity type determining impurity therein with a concentration of about 2 to 4 times $10^{17}$ cm.$^{-3}$ was polished to a mirror finish encapsulated in an evacuated quartz tube together with a single chip of Mn metal. A first diffusion was carried out at about 900° C. for a period of four hours, resulting in a junction depth of about 4 mils. The "p-n" junctions were then revealed by electrolytic etching in a dilute KOH solution. The resulting wafer was then re-encapsulated in a quartz tube; but, this time with a chip of Zn metal and a second diffusion took place at about 900° C. for a period from 15 to 45 minutes. The time and temperature of the second Zn diffusion was chosen so as to keep the Zn penetration much smaller or shallower than the Mn penetration, i.e., 3 mils. The second diffusion did not change the relative position of the initial junction formed between the n-type GaAs and the Mn diffused therein resulting in a "p°" region of about 30 microns. The wafer was then cleaved into cleaved into parallelepipeds of the proximate dimensions of 10 x 5 x 5 mils. Ohmic contacts were made to the device using tin on the "n" side of the wafer and indium on the "p" side of the wafer. The devices were then tested to determine their characteristics as indicated previously in the specification and observations and measurements made of the emitted light intensities. In the above devices, the "p" region 12 was approximately 70 microns thick, the high resistivity "p°" region 30 microns thick and the "n" region which constitutes the remainder of the n-type GaAs crystal approximately 3 mils thick. The concentration of Zn in the "p" region 12 for this device was about $10^{20}$ atoms/cm.$^{-3}$, the concentration of manganese was about $10^{18}$ atoms/cm.$^{-3}$ in the "p°" region 14.

Other examples using slightly different temperatures and diffusion times yielded diodes behaving in much the same manner, but, having slightly different spectral intensity distributions with varying concentrations of Mn and Zn atoms in their respective "p°" and "p" regions.

An electroluminescent diode having negative resistance characteristics may be made according to the teachings of the present invention by using impurity concentrations within the general areas set forth above. It should further be noted that in addition to manganese (Mn) as a deep level acceptor, chrominum (Cr) could be used; and, that in addition to zinc (Zn) as a shallow level acceptor, such materials as cadmium (Cd) or magnesium (Mg) could be used.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An electroluminescent diode having a negative resistance characteristic comprising three active regions in a host semiconductor body,
   a first region being of low resistivity and having shallow level acceptor impurities therein,
   a second region contiguous to said first region of high resistivity having a deep level acceptor impurity material therein, said deep level acceptor impurity being characterized by having an ionization potential at least twice that of said shallow level acceptor impurity,
   a third region contiguous to said second region having low resistivity and having suitable donor impurity material therein, and
   means for making ohmic contact to said first and third regions.

2. An electroluminescent diode having a negative resistance characteristic comprising three active regions in a host gallium arsenide body including:
   a first region of low resistivity having acceptor impurities therein chosen from the group consisting of zinc, cadmium, and magnesium,
   a second region contiguous to said first region of high resistivity having acceptor impurity material therein chosen from the group consisting of manganese and chromium,
   a third region contiguous to said second region having low resistivity and having donor impurity material therein chosen from the group consisting of tellurium, selenium, and silicon, and
   means for making ohmic contact to said first and third regions.

3. An electroluminescent diode having a negative resistance characteristic comprising three active regions in a host gallium arsenide body including:
   a first region of low resistivity and having zinc acceptor impurities therein,
   a second region contiguous to said first region of high resistivity having manganese acceptor impurity material therein,
   a third region contiguous to said second region having low resistivity and having tellurium donor impurity material therein, and
   means for making ohmic contact to said first and third regions.

4. An electroluminescent diode as set forth in claim 3 wherein,
   said first low resistivity region containing zinc as the acceptor material contains approximately $10^{20}$ atoms of zinc/cm.$^{-3}$ of gallium arsenide and wherein,
   in said second high resistivity region said manganese is present in the proportion of approximately $10^{18}$ atoms of Mn/cm.$^{-3}$ of gallium arsenide.

5. An electroluminescent diode as set forth in claim 4 above wherein,
   said second high resistivity region constituting a diffusion layer of the acceptor material manganese into an "n" doped block of gallium arsenide to a given distance,
   said first region constituting a diffusion layer of zinc into said block of gallium arsenide but wherein said second diffusion layer penetrates a shorter distance than said first diffusion, and
   wherein said first and second diffusion layers are present on only one face of said gallium arsenide body.

6. An electroluminescent negative resistance diode comprising:
   a body of n-type gallium arsenide,
   a first high resistivity p-type layer adjacent the n-type gallium arsenide and forming a "p-n" junction therewith, said first layer containing manganese as the predominant conductivity type determining impurity therein,
   a second low resistivity p-type layer adjacent the high resistivity layer containing zinc as the predominant conductivity type determining impurity therein, and
   ohmic contacts made to the low resistivity p-type layer and the n-type region.

7. An electroluminescent negative resistance diode as set forth in claim 6 wherein,
   said first and second layers within the body of n-type gallium arsenide are produced by diffusion reactions and wherein,
   the manganese is present in said first layer in a concentration of approximately $10^{18}$ atoms of manganese/cm.$^{-3}$ of gallium arsenide, and
   wherein the zinc is present in the second layer in a concentration of approximately $10^{20}$ atoms of zinc/cm.$^{-3}$ of gallium arsenide.

References Cited by the Examiner

UNITED STATES PATENTS

| | | | |
|---|---|---|---|
| 3,054,033 | 9/1962 | Iwama et al. | 307—88.5 |
| 3,096,442 | 7/1963 | Stewart | 307—88.5 |
| 3,102,201 | 8/1963 | Braunstein | 307—88.5 |
| 3,134,905 | 5/1964 | Pfann | 317—235 |
| 3,170,067 | 2/1965 | Kibler | 317—235 |

OTHER REFERENCES

"Gallium Arsenide Tunnel Diodes," by Holonyak and Lesk; Proceedings of the IRE, August 1960, pp. 1405–1409.

ARTHUR GAUSS, *Primary Examiner.*

R. H. EPSTEIN, *Assistant Examiner.*